United States Patent [19] [11] 3,739,283
Colligan [45] June 12, 1973

[54] METHOD OF COMMUNICATING WARNING INFORMATION VIA THE INTERMEDIATE FREQUENCY OF A SUPERHETERODYNE RADIO AND/OR TELEVISION RECEIVER

[76] Inventor: Francis S. Colligan, 5200 Oakland Road, Chevy Chase, Md. 20015

[22] Filed: Dec. 2, 1971

[21] Appl. No.: 204,012

[52] U.S. Cl. .................. 325/373, 325/64, 325/308, 325/364, 325/365, 325/435, 325/466, 340/224
[51] Int. Cl. .................. H04b 1/16
[58] Field of Search .................. 325/31, 55, 308, 325/309, 364, 365, 373, 376, 435, 466, 64; 340/164, 224, 416

[56] References Cited

UNITED STATES PATENTS 3,562,650 2/1971 Gossard et al. .................. 325/308

*Primary Examiner*—Albert J. Mayer
*Attorney*—Donald A. Kettlestrings

[57] ABSTRACT

A method of communicating warning information via the intermediate frequency of a superheterodyne radio and/or television receiver. A separate intermediate frequency signal bearing warning information, such as a tone, is transmitted and is received at a receiver simultaneously with reception of a conventionally modulated carrier signal. The separate intermediate frequency signal bypasses the mixer and the local oscillator of the receiver and is fed directly into the intermediate frequency amplifier of the receiver and through the intermediate frequency detector to provide the warning information in audio or visual form for the radio or television user.

9 Claims, 1 Drawing Figure

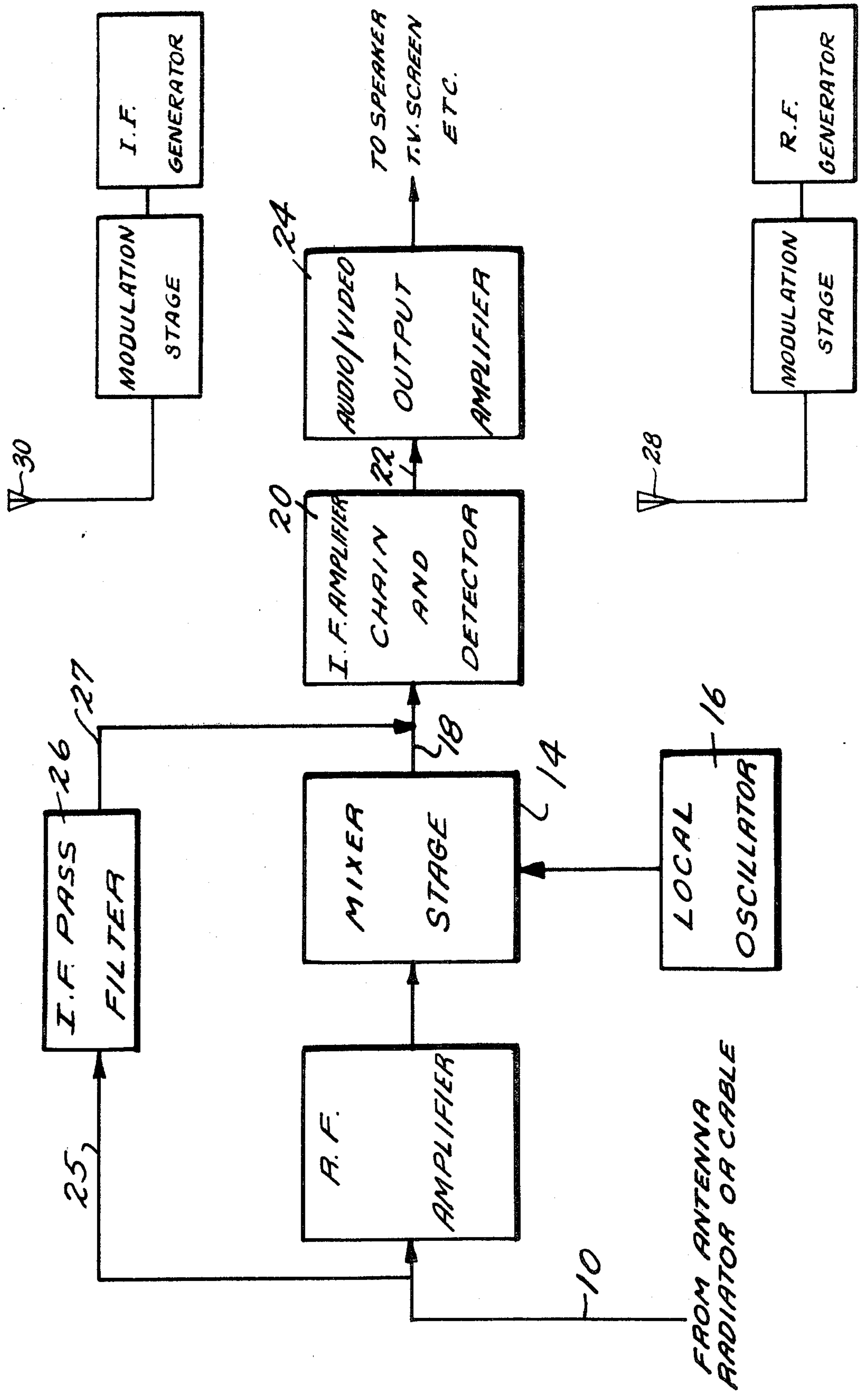
I.F. GENERATOR
MODULATION STAGE
30
TO SPEAKER T.V. SCREEN ETC.
24
AUDIO/VIDEO OUTPUT AMPLIFIER
22
20
I.F. AMPLIFIER CHAIN AND DETECTOR
R.F. GENERATOR
MODULATION STAGE
28
27
26
I.F. PASS FILTER
18
MIXER STAGE
14
16
LOCAL OSCILLATOR
25
R.F. AMPLIFIER
10
FROM ANTENNA RADIATOR OR CABLE

METHOD OF COMMUNICATING WARNING INFORMATION VIA THE INTERMEDIATE FREQUENCY OF A SUPERHETERODYNE RADIO AND/OR TELEVISION RECEIVER

This invention relates to a method of communicating a warning signal, and more particularly to a method of simultaneously broadcasting a normal radio or television signal and a warning signal via the intermediate frequency of a superheterodyne radio and/or television receiver.

A number of systems and methods for alerting the public to an emergency by the use of radio and/or television receivers have been developed, but in all such prior art systems complex and expensive warning system circuitry has been required.

For example, systems have been developed for alerting the public in connection with the civilian defense system, frequently referred to as the "Conelrad" system by which emergency alerts and messages are promulgated throughout the country. Still other systems have been designed for use in conjunction with the predetermined NEAR code that is transmitted over preexisting power transmission lines and networks.

Thus, it has been widely recognized that the use of radio and television receivers is ideal for placing the public on notice of an emergency situation, such as impending floods, hurricanes, tornadoes or a nuclear attack.

However, all previously known systems and methods of using radio and/or television receivers for communicating such warning or emergency information have required the use of complex electrical circuitry and mechanical devices to supplement the conventional receivers. This, of course, greatly increases the cost of the radio or television incorporating these additional features, and the likelihood of malfunction of the system is also greatly increased because of the additional circuitry and mechanical apparatus required.

It is, therefore, an object of the present invention to provide a method for communicating emergency or warning information via the intermediate frequency of a superheterodyne radio and/or television receiver without requiring extensive circuit additions to the receiver.

Another object is to provide a method for broadcasting a warning signal simultaneously with conventional radio and/or television modulated carrier signal information.

A further object of the invention is the provision of a method for communicating warning information, which method is particularly suited for use with a community antenna television system (C.A.T.V.).

Still another object is to provide a method of communicating a warning signal, which method is readily applicable for use with confined highway broadcasting systems.

Additional objects and advantages of the invention will be set forth in part in the description which follows, and in part will be obvious from the description or may be learned by practice of the invention. The objects and advantages are realized and attained by the instrumentalities and combinations particularly pointed out in the appended claims.

To achieve these and other objects, the present invention provides, in the operation of a communication system involving transmission of an information-bearing modulated carrier signal, reception of the modulated carrier signal, heterodyning of the modulated carrier signal by means of a mixer and a local oscillator to form an intermediate frequency signal and amplifying and detecting the intermediate signal by means of an intermediate amplifier and detector to provide audio and visual information, the method of simultaneously communicating additional warning or other information. This method includes the steps of generating a separate and additional information-bearing signal at the intermediate frequency, transmitting the separate intermediate frequency signal, receiving the separate intermediate frequency signal simultaneously with the reception of the modulated carrier signal, bypassing the mixer and the local oscillator with the separate intermediate frequency signal, receiving the separate intermediate frequency signal, at the intermediate frequency amplifier, and detecting the separate intermediate frequency signal to provide the additional information in audio or visual form for the radio or television user. The separate intermediate frequency signal may or may not be modulated prior to its transmission, as desired. The type of warning information to be presented to the radio or television user determines whether the separate intermediate frequency signal is or is not modulated.

Preferably, the method also includes the step of passing the second intermediate frequency signal through an intermediate frequency filter prior to receiving the separate intermediate frequency signal at the intermediate frequency amplifier within the receiver.

The method of this invention is also readily applicable to community antenna television systems (C.A.T.V.) and traffic or highway confined area broadcasting systems for notifying drivers of road conditions ahead. When used with a C.A.T.V. system, the method of this invention may cause the normal radio or television modulated carrier signal and the intermediate frequency warning signal to both be passed along the C.A.T.V. cable for broadcasting from an antenna or for direct cable connection to the individual receivers of the C.A.T.V. subscribers.

When the method of this invention is used in conjunction with a traffic or highway confined area broadcasting system, the automobile radio can receive the normal modulated carrier signal as broadcast from the radio station transmitter, but the intermediate frequency warning signal is transmitted from transmitters or radiators positioned along or beneath the roadway. With transmitters positioned along and immediately adjacent to or beneath the roadway, the intermediate frequency warning signal would be attenuated to a level (outside the immediate vicinity of the roadway) that satisfies the requirements of the Federal Communications Commission. However, the intermediate frequency warning signal would be in such close proximity to the car radio receivers that the intermediate frequency warning signal would be strong enough to be received by the car radio receivers in the manner taught by this invention.

The communication method of this invention is effective regardless of which station or channel a radio or television set is tuned to, and the radio or television need only be in use at the time of transmission of the warning signal. The present invention obviates the complex circuitry and additional mechanical device requirements of previously known systems and requires little or no modification to the radio or television superheterodyne receiver. This, of course, provides the advantages of maintaining the cost of the receivers at a low level while also reducing the possibilities for malfunction.

It is to be understood, of course, that both the foregoing general description and the following detailed description are exemplary and explanatory and are not restrictive of the invention.

The accompanying drawing, which is incorporated in and constitutes a part of this specification, illustrates the operation of the invention, and together with the description, serves to explain the principles of the invention.

The FIGURE illustrates, in block diagram form, a receiver for use with the method of this invention.

With reference to the FIGURE, there is shown a superheterodyne receiver having a cable or an antenna 10 coupled to a radio-frequency stage or amplifier 12. Amplifier 12, in turn, is coupled to mixer stage 14, which has a local oscillator 16 coupled thereto so that the incoming signal from antenna 10 is heterodyned with the locally generated signal from oscillator 16 to produce a beat frequency signal or intermediate frequency signal at output 18 from mixer stage 14. The intermediate frequency signal at output 18 may vary in frequency depending upon the purpose for which the receiver is designed. For example, the intermediate frequency for automobile radios may be 262 kilocycles, for home and portable AM radios — 455 kilocycles, for FM receivers — 10.7 megacycles, and for television receivers — 41.25 megacycles.

The intermediate frequency at output 18 has the same modulation as the modulated carrier signal entering the receiver via antenna or cable 10, and the intermediate frequency signal is then fed through intermediate frequency amplifier chain and detector 20. The intermediate frequency signal is demodulated in detector 20 and the demodulated signal at output 22 is then further amplified and coupled to the radio or television speaker or to the television screen via output amplifier 24.

Various additional circuit elements (not shown) may also be provided to prevent passage of any externally generated intermediate frequency signal through amplifier 12 and through mixer 14. In addition, the receiver can be modified in accordance with this invention by placing an intermediate frequency pass filter 26 so that it is coupled between antenna or cable 10 and intermediate frequency amplifier 20. The use of filter 26 together with various other circuit elements (not shown) for preventing passage of the intermediate frequency signal through amplifier 12 and mixer 14 enhances segregation of the intermediate frequency signal from the modulated carrier signal and encourages the intermediate frequency signal received by antenna or cable 10 to pass filter 26 and via lines 25 and 27 directly to intermediate frequency amplifier 20.

Experience, however, has shown that the use of a filter or filters 26 may not be necessary in many receivers since leakage around amplifier 12 and mixer stage 14 will often occur if an intermediate frequency signal of sufficient strength is supplied to antenna or cable 10. This leakage may occur without the use of filter 26 because of the inherent electrical design and mechanical construction of the receiver.

In operation of the communication method of this invention, a conventional information-bearing, modulated carrier signal is received by cable or antenna 10. A cable would probably be used in the example of a C.A.T.V. system, and an antenna 28 would likely be used where the receiver is a conventional radio or television set in the home or in an automobile.

The modulated carrier signal passes through amplifier 12 and into mixer stage 14 where it is mixed with the frequency from local oscillator 16 to produce an intermediate frequency at mixer output 18. This intermediate frequency signal is then passed through intermediate frequency amplifier chain and detector 20 and then to output amplifier 24 to provide audio or visual information to the radio or television user.

Simultaneously with such reception by the receiver of a conventional modulated carrier signal, a separate intermediate frequency warning signal, having the same frequency as the intermediate frequency signal at output 18, is generated and transmitted to be received by antenna or cable 10. This warning signal may be modulated to provide a warning tone, for example. Where a C.A.T.V. system is used, the warning signal may be transmitted to the receiver by a cable 10. Where the receiver is being used, for example, with a highway confined area broadcasting or warning system, the warning signal can be generated by various types of roadway radiators or antennas 30 positioned immediately adjacent to or beneath the roadway and the warning signal will then be received by antenna 10 of the receiver.

Any strong intermediate frequency signals would normally be prevented from passing through amplifier 12 and mixer 14. However, the relatively strong intermediate frequency warning signal of the invention, provided as a result of use of a C.A.T.V. cable or as a result of the close proximity of the highway transmitters to the receiver, for example, will leak around amplifier 12 and mixer 14 because of the inherent electrical design and mechanical construction of the receiver. Alternatively, the warning signal will pass through lead 25, through intermediate frequency pass filter 26 and through line 27 directly to the input of the intermediate frequency amplifier 20.

Thus, the intermediate frequency warning signal will pass through filter 26 or will leak around amplifier 12 and mixer 14 to the input of amplifier 20. The warning signal will then pass through amplifier chain and detector 20 and through output amplifier 24 to provide the warning information to the radio or television user.

The present invention, therefore, provides for a practical and effective method for transmitting emergency or warning information to the general public. The invention avoids the necessity for complex warning system circuitry and mechanical apparatus, and so, enables every simple and presently existing radio and television receiver to be used in conjunction with the invention. Thus, every radio or television receiver now in use could be used with this invention and the success of the invention does not hinge on the purchase by the public of new radios and television sets. The invention also has particular application for C.A.T.V. systems and for use with low power transmitters or antennas under or immediately adjacent to a road surface for warning motorists of road conditions ahead.

The invention in its broader aspects is not limited to the specific details shown and described, and departures may be made from such details without departing from the principles of the invention and without sacrificing its chief advantages.

What is claimed is:

1. In the method of operation of a communication system involving transmission of an information-bearing modulated carrier signal, reception of said modulated carrier signal, heterodyning of said modulated carrier signal by means of a mixer and a local oscillator to form an intermediate frequency signal, and amplifying and detecting of said intermediate signal by means of an intermediate frequency amplifier and detector to provide audio or visual information, the improvement of simultaneously communicating additional information comprising the steps of generating a separate and additional information-bearing signal at said intermediate frequency, transmitting said separate intermediate frequency signal, receiving said separate intermediate frequency signal simultaneously with said reception of said modulated carrier signal, bypassing said mixer and said local oscillator with said separate intermediate frequency signal, receiving said separate intermediate frequency signal at said intermediate frequency amplifier, and detecting said separate intermediate frequency signal to provide said additional information in audio or visual form.

2. A method of simultaneously communicating different information as in claim 1 further including the step of passing said second intermediate frequency signal through an intermediate frequency filter prior to receiving said separate intermediate frequency signal at said intermediate frequency amplifier.

3. A method of simultaneously communicating different information as in claim 1 wherein said information-bearing modulated carrier signal and said additional information-bearing separate intermediate frequency signal are transmitted via cable.

4. A method as in claim 3 wherein said modulated carrier signal and said separate intermediate frequency signal are transmitted from separate locations.

5. A method as in claim 1 wherein said modulated carrier signal and said separate intermediate frequency signal are broadcast by transmission from at least one location.

6. A method as in claim 5 wherein said modulated carrier signal and said separate intermediate frequency signal are broadcast by transmission from separate antennas at different locations.

7. A method as in claim 1 wherein said separate intermediate frequency signal is a warning signal.

8. A method as in claim 1 wherein the frequency of said intermediate frequency signals is 262 kilocycles, 455 kilocycles, 10.7 megacycles, or 41.25 megacycles.

9. A method as in claim 1 wherein said separate intermediate frequency signal is modulated prior to its transmission.

* * * * *